(12) United States Patent
Austin et al.

(10) Patent No.: US 12,365,348 B2
(45) Date of Patent: Jul. 22, 2025

(54) DETERMINATION OF VEHICLE CLEARANCE AND OPTIMIZED ORIENTATION OF OBJECTS PLACED ON ROOF

(71) Applicant: TOYOTA MOTOR ENGINEERING & MANUFACTURING NORTH AMERICA, INC., Plano, TX (US)

(72) Inventors: Benjamin Piya Austin, Saline, MI (US); John K. Lenneman, Okemos, MI (US); Joshua E. Domeyer, Madison, WI (US); Philip J. Babian, Canton, MI (US); George M. Evans, Ann Arbor, MI (US)

(73) Assignees: TOYOTA MOTOR ENGINEERING & MANUFACTURING NORTH AMERICA, INC., Plano, TX (US); TOYOTA JIDOSHA KABUSHIKI KAISHA, Aichi-ken (JP)

( * ) Notice: Subject to any disclaimer, the term of this patent is extended or adjusted under 35 U.S.C. 154(b) by 60 days.

(21) Appl. No.: 18/063,240

(22) Filed: Dec. 8, 2022

(65) Prior Publication Data
US 2024/0190445 A1    Jun. 13, 2024

(51) Int. Cl.
*B60W 40/12*    (2012.01)

(52) U.S. Cl.
CPC ......... *B60W 40/12* (2013.01); *B60W 2420/00* (2013.01); *B60W 2530/00* (2013.01)

(58) Field of Classification Search
CPC ............. B60W 40/12; B60W 2420/00; B60W 2530/00
USPC .............................................................. 701/1
See application file for complete search history.

(56) References Cited

U.S. PATENT DOCUMENTS

| | | | |
|---|---|---|---|
| 8,354,920 B2 | 1/2013 | Kole | |
| 9,243,440 B1 * | 1/2016 | Higgins | B60J 7/057 |
| 9,269,263 B2 | 2/2016 | Gieseke | |
| 9,477,894 B1 | 10/2016 | Reed et al. | |
| 10,331,952 B2 * | 6/2019 | Malecki | G05D 1/0206 |
| 10,528,212 B2 | 1/2020 | Gross et al. | |
| 2005/0173945 A1 | 8/2005 | Frank et al. | |
| 2013/0099909 A1 * | 4/2013 | Merritt | B62J 3/00 340/432 |
| 2016/0067547 A1 * | 3/2016 | Anthony | G01P 15/0891 702/141 |
| 2017/0113745 A1 | 4/2017 | Cook et al. | |
| 2018/0018619 A1 * | 1/2018 | Kisiler | G06Q 10/083 |
| 2020/0023834 A1 * | 1/2020 | Gowda | B60W 30/0953 |
| 2020/0231392 A1 * | 7/2020 | Singh | B64D 1/22 |
| 2020/0372315 A1 * | 11/2020 | Jablonski | G01S 11/04 |

* cited by examiner

Primary Examiner — Krishnan Ramesh
(74) Attorney, Agent, or Firm — HAYNES AND BOONE, LLP

(57) ABSTRACT

A system and method in communication with a sensor that can attach to objects placed on the roof of a vehicle acquires dimensional data to determine the position/orientation of the objects on the roof and determine the clearance of the vehicle based on the orientation of the object. The system recommends an orientation of the object to be placed in (e.g., based on the acquired dimensions of the object) to optimize aerodynamics and/or to reduce clearance.

15 Claims, 4 Drawing Sheets

DETERMINATION OF VEHICLE CLEARANCE AND OPTIMIZED ORIENTATION OF OBJECTS PLACED ON ROOF

FIELD OF THE DISCLOSURE

The present disclosure relates generally to vehicle systems and, more particularly, to systems which determine vehicle clearance and positioning of objects on the roof to optimize aerodynamics and reduce clearance.

BACKGROUND

It is often desirable to know the clearance of vehicles traveling along roadways, especially vehicles which are carrying light or heavy freight on the vehicle roof. In addition, the orientation of objects on a vehicle roof can adversely affect the gas mileage or result in very unsafe conditions for vehicle occupants or other vehicles on the roadway. For example, due to the orientation of the objects, they may become untethered or otherwise break loose from roof securing means, thereby resulting in dangerous flying objects or road hazards at high speeds. Moreover, when these objects are poorly oriented on the roof, gas mileage is reduced due to unnecessary drag, which in turn leads to more costly transportation.

SUMMARY

In consideration of the above-described disadvantages, the present disclosure provides computer-implemented systems and methods to determine vehicle clearance and the orientation for objects on the roof that reduces clearance and optimize aerodynamics of the vehicle. A vehicle processing unit is in communication with one or more sensors to obtain dimensional data of one or more objects on the roof of the vehicle. The vehicle processing unit then determines a first orientation of the roof object using the dimensional data. The clearance of the vehicle is then determined using the first orientation. The vehicle processing unit then determines a second orientation of the object on the roof that optimizes aerodynamics of the vehicle or reduces clearance of the vehicle.

In certain illustrative embodiments of the present disclosure, there are a plurality of objects on the roof. In such embodiments, the second orientation corresponds to the orientation of the objects that optimizes aerodynamics or reduces clearance of the vehicle.

In yet other illustrative embodiments, the processing unit determines the second orientation by taking into account both aerodynamics and clearance of the vehicle.

In yet other illustrative embodiments, the processing unit uses route information of the vehicle to determine the second orientation.

In certain other embodiments, the one or more sensors can be removably coupled to the object(s) on the roof of the vehicle.

In yet other illustrative embodiments, a plurality of sensors are placed on moveable components of the objects of on the roof. In such embodiments, the dimensional data corresponds to movements of these components.

It is to be understood that both the foregoing general description and the following detailed description are exemplary and explanatory in nature and are intended to provide an understanding of the present disclosure without limiting the scope of the present disclosure. In that regard, additional aspects, features, and advantages of the present disclosure will be apparent to one skilled in the art from the following detailed description.

DESCRIPTION OF ILLUSTRATIVE EMBODIMENTS

Figure 1:
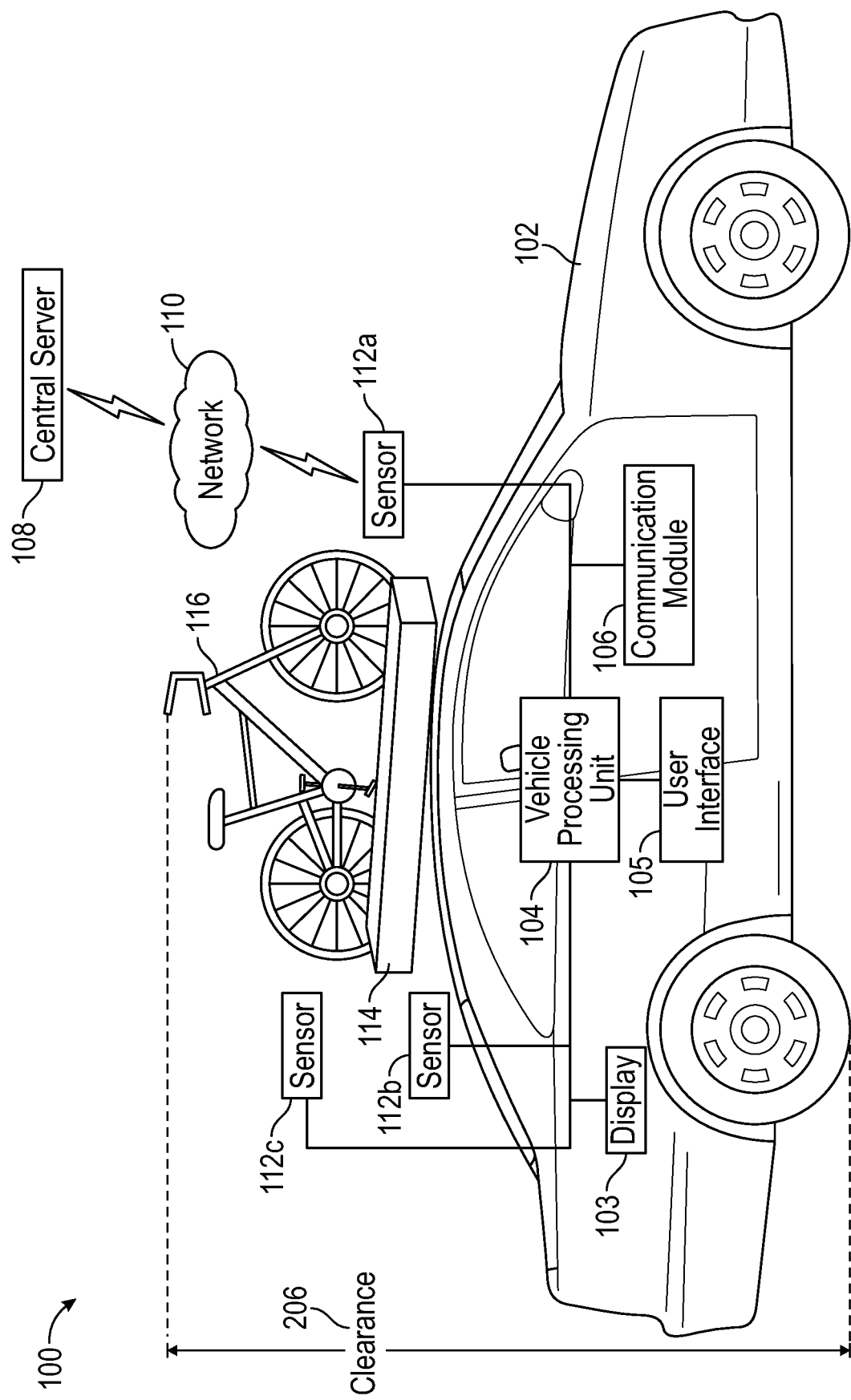
FIG. 1 is a diagrammatic illustration, in block diagram form, of a vehicular system according to certain illustrative embodiments of the present disclosure.

Illustrative embodiments and related methods of the present disclosure are described below as they might be employed in systems and methods for determining vehicle clearance and optimized orientations for objects on vehicle roofs. In the interest of clarity, not all features of an actual implementation or method are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure. Further aspects and advantages of the various embodiments and related methods of the disclosure will become apparent from consideration of the following description and drawings.

As described herein, the present disclosure describes a system in communication with one or more sensors that can attach to objects placed on the roof of a vehicle. The sensor may be any sensor suitable for measuring the dimensions of the object, such as a camera, radar, LiDAR, ultrasonic sensor, and the like. In any case, when the sensor is placed on and/or near an object, the system uses the acquired sensor data to determine the position/orientation of the objects on the roof based on the dimensions of the objects. For example, if the object is a bike, the system can determine if the bike is lying flat or if the bike is vertical to determine the precise clearance of the vehicle based on the orientation of the object. In one example, the system recommends an orientation of the object to be placed in (e.g., based on the acquired dimensions of the object) to optimize aerodynamics and/or to reduce clearance.

As described herein in more detail, methods and systems of the present disclosure detect data from one or more dimensional sensors associated with a vehicle roof and recommends an optimal orientation to maximize aerodynamics of the vehicle. The system determines the clearance of the vehicle using the sensors that detect the dimensions of one or more objects placed on a vehicle roof, where the system further suggests an optimal orientation of the objects on the roof. A processing unit analyzes the dimensional data and calculates a first orientation of the object on the roof. The processing unit then, using the first orientation data, determines the clearance of the vehicle. Thereafter, using the dimensional data and/or clearance data, the processing unit determines a second orientation of the one or more objects on the roof that optimizes aerodynamics of the vehicle or reduces clearance of the vehicle.

When the sensor(s) are placed on and/or near an object on the vehicle roof, the system uses the acquired dimensional (depth, width and height) data to determine the position/orientation of the objects on the roof based on the dimensions of the objects. For example, if the object is a bike, the system determines if the bike is lying flat or if the bike is vertical in order to determine the precise clearance of the vehicle based on the orientation of the object. In one illustrative embodiment, the system recommends an orientation for the object to be placed in (e.g., based on the acquired dimensions of the object) to optimize aerodynamics and/or to reduce clearance. Vehicle clearance, as defined herein, refers to the distance between the road and the upper end of objects positioned on the roof of the vehicle.

FIG. 1 is a diagrammatic illustration, in block diagram form, of a vehicular system according to certain illustrative embodiments of the present disclosure. In this example, the vehicular system if referred to by the reference numeral 100 and may include a vehicle 102, such as an automobile, and a vehicle control unit (or vehicle processing unit) 104 located within vehicle 102. The vehicle 102 may include any variety of additional components to enable interaction with vehicle occupants, such as electronic displays 103 and user interfaces 105. A communication module 106 is adapted to enable wired or wireless communication between various components of the system and central serves 108 via a network 110 (e.g., a 3G network, 4G network, Wi-Fi network, or the like, including communicating via a combination of one or more networks). The central server 108 may provide information and services including, but not limited to, vehicle dimensions and clearance data, route or path, location, weather, mapping and topography data.

Vehicle processing unit 104 is communicably coupled to one or more dimensional sensors 112a,b,c. In this example, sensor 112a is coupled to the roof of vehicle 102, while sensor 112b is removably coupled to a first object 114 on the roof, and sensor 112c is coupled to a second object 116 on the roof. In alternative embodiments, one or more of sensors 112a,b,c may be removably coupled to the roof of vehicle 102 or any of the objects positioned on the roof of vehicle 102. In this example, first object 114 is a box and second object 116 is a bike. However, in other examples, the objects may be kayaks, luggage, or other objects. Sensors 112a,b,c, may be any variety of sensors that determine the dimensions of the objects (e.g., the height, width or length) on the roof such as, for example, a camera radar, LiDAR, or ultrasonic sensor. The sensors may be permanently or removably coupled to the roof and/or objects on the roof. Ultimately, the dimensional data obtained by sensors 112a,b,c will be used by processing unit 104 to determine an optimal orientation for placing objects 114 and 116 on the roof of vehicle 102.

The vehicle processing unit 104 is operably coupled via wired or wireless means to all components in vehicular system 100. As illustrated, vehicle processing unit 104 is housed outside the interior of the vehicle 102 and may be housed anywhere on or within the vehicle 102. In other embodiments, the vehicle processing unit 104 or components thereof may be disposed remote from the vehicle 102 and may be communicably coupled to the vehicle 102 by a cellular or other network without departing from the scope of the disclosure. The vehicle processing unit 104 receives and processes dimensional data obtained by sensors 112a, b,c. For example, the vehicle processing unit 104 may include circuitry or electronics to analyze the dimensional data to determine the dimensions, orientations, etc of objects 114 and 116 on the roof of vehicle 102. The vehicle processing unit 104 may also issue commands to one or more controlled components of system 100 as described in greater detail below.

User interface 105 and display 103 are used to interact with vehicle occupants when determining vehicle clearance and recommending optimized orientations of objects on the roof. In certain embodiments, a vehicle occupant my prompt the system 100 via user interface 105, whereby the methods of the present disclosure are performed. In other embodiments, system 100 may automatically perform the methods and display alerts, warning and/or recommendations for the orientations in audio or visual form, accordingly.

Telephones, personal computers and/or other personal devices may also be responsive to the vehicular system 100. The telephones may be communicably coupled to the vehicle processing unit 104 through short-range wireless communication protocols, or by wired connections established by the occupants of vehicle 102.

Figure 2:
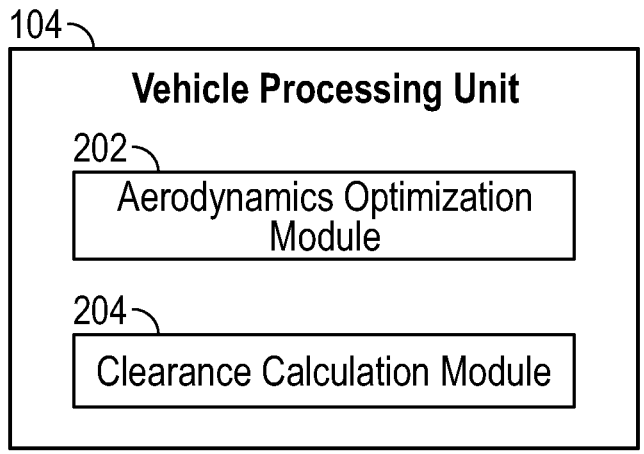
FIG. 2 is a diagrammatic illustration of a vehicle processing unit, according to certain illustrative embodiments of the present disclosure.

FIG. 2 is a diagrammatic illustration of vehicle processing unit 104, according to certain illustrative embodiments of the present disclosure. Vehicle processing unit 104 includes aerodynamics optimization module 202 which obtains the dimensional data from sensors 112a,b,c and performs the aerodynamic calculations necessary to determine the position of objects 114 and 116 to optimize the aerodynamics of vehicle 102. The dimensional data will include the length, width and height of objects on the roof. In yet other embodiments as described below, the dimensional data may also include drag and other dimensional data related to moveable components of the objects on the roof.

In order to perform the methods of the present disclosure, aerodynamics optimization module uses the dimensional data. In one illustrative embodiment, the system may calculate and provide recommendations to minimize the surface area of each object facing the direction of travel. In other examples, using geometric data from the sensors, the system can match surface geometries of roof objects to a library/database of identical/similar geometries that are coupled with aerodynamic data to provide recommendations, accordingly. These and other methods of calculation will be understood by those ordinarily skilled in the art having the benefit of this disclosure.

In cases where a single object is on the roof, aerodynamic optimization module 202 will determine the optimal position of that single object. In other examples when multiple objects are positioned on the roof (as in FIG. 1), aerodynamics optimization module 202 determines the optimal orientation of both objects in relation to one another. In certain illustrative methods, the system may calculate each individual surface area of the objects and sum the combined resistance caused by placement of each individual object. In other examples, leaning on aerodynamic cloud databases (e.g., matching geometrics as mentioned above) integrated with vehicle-to-infrastructure and vehicle-to-vehicle networks, the system can make a determination on how close objects should be placed in relation to one another. The system may then apply air flow accelerometers mounted at the back of the vehicle and on the roof to calculate cumulative resistance, drag and aerodynamic efficiency.

Clearance calculation module 204 performs the calculation of the vehicle clearance 206 (FIG. 1) at any time using the dimensional data obtained from sensors 112*a,b,c*. In one example, the system simply takes the maximum height of the objects, while taking account for suspension and any changes in height of the vehicle as it is traveling. Various methods exist for such calculations, as will be understood by those ordinarily skilled in the art having the benefit of this disclosure.

The vehicle processing unit 104 includes a microprocessor and a memory (not shown). Any processor or microprocessor and memory capable of storing data, processing the data, executing routines and other functions described herein may be employed. As described herein, a processor or microprocessor includes any device capable of executing machine readable instructions. Accordingly, the microprocessor may be an integrated circuit, a microchip, a computer, or any other computing device. The memory may include RAM, ROM, a flash memory, a hard drive, or any device capable of storing machine readable instructions. The vehicle processing unit 104 processes the various inputs from the sensors 112*a,b,c*, determines the optimal orientations, and outputs those orientations via display 103 or otherwise.

In certain illustrative embodiments, vehicle processing unit 104 determines the orientation of objects 114,116 that optimizes the aerodynamics of vehicle 102. In other embodiments, vehicle processing unit 104 determines the orientation of objects 114,116 that reduces the clearance 206 of vehicle 102. In other embodiments, vehicle processing unit 104 performs calculations which balance reducing the clearance with increasing aerodynamics in order to determine the position which most optimizes both clearance and aerodynamics.

In yet other embodiments, vehicle processing unit 104 determines the optimal orientation of objects 114,116 based on the vehicle path or route. For example, in certain embodiments, the route will include surface streets which are low speed. In other examples, the route may include highways and high speeds. In other examples, the route may be a route which is heavily travelled by tractor trailers, which will affect the aerodynamics of vehicle 102 as it travels alongside these larger vehicles.

In yet other embodiments, sensors 112*a,b,c* may be removably coupled to static or dynamic parts of objects 114,116. For example, if a bike is positioned on the roof of vehicle 102 such that the bike wheels are upright and free to spin, one of sensors 112*a,b,c*, may be positioned on the wheel. In turn, as the wheel spins, the data obtained from the corresponding dynamic sensor will be used by aerodynamics optimization module 202 to determine the resulting drag caused by the spinning wheel. Accordingly, the drag will be taken into account in order to determine the best position of the bike which optimizes aerodynamics of the vehicle 102. In yet other embodiments, a moveable component of the objects on the roof may also affect the geometry and overall dimensions of the object, which will also be taken into account by aerodynamics optimization module 202 to determine the dimensions of the object.

Figure 3A:
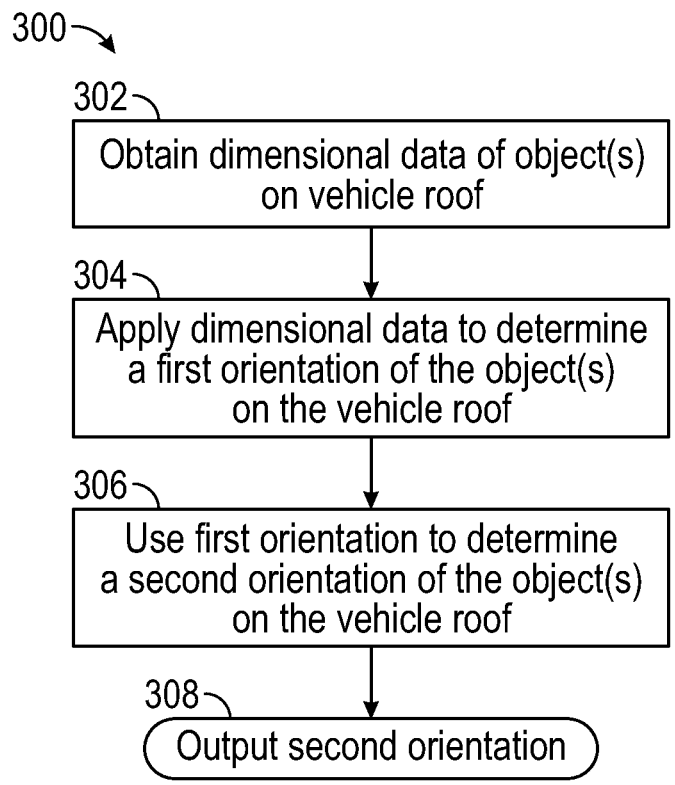
FIG. 3A is a flow chart of an illustrative method for determining the orientation of objects on a vehicle roof, according to certain illustrative embodiments of the present disclosure.
Figure 3B:
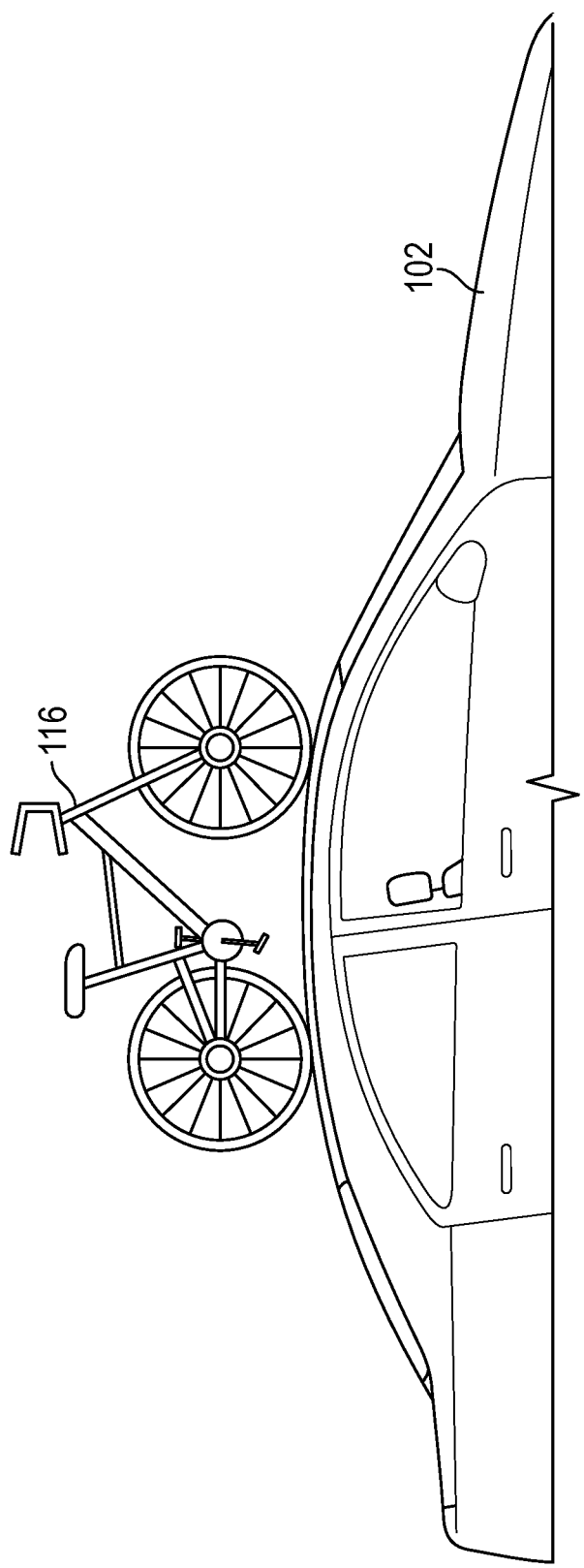
FIG. 3B illustrates a first orientation of an object on a vehicle roof.
Figure 3C:
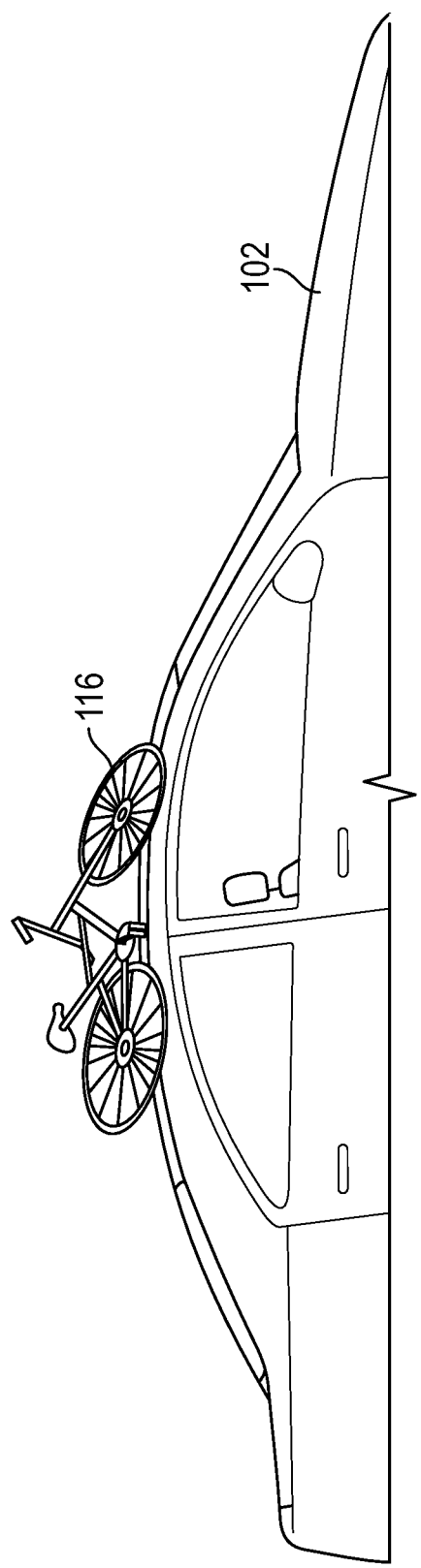
FIG. 3C illustrates a second orientation of the object of FIG. 3B as determined using the exemplary methods described herein.

Referring now to FIG. 3A, and with continued reference to FIGS. 1 and 2, an illustrative method 300 for determining the orientation of objects on a vehicle roof is illustrated. At block 302, vehicle processing unit 104 obtains dimensional data of one or more objects on the roof of vehicle 102 using sensors 112*a,b,c*. At block 304, vehicle processing unit 104 uses the dimensional data to determine the first orientation of the object(s) on the roof. FIG. 3B illustrates the first orientation of bike 116. This determination may be performed at any time (while vehicle is moving or stationary). In certain illustrative embodiments, vehicle processing unit 104 uses the first orientation data to determine the clearance 206 of vehicle 102. At block 306, vehicle processing unit 104 uses the first orientation data to determine a second orientation of the object(s) which optimizes aerodynamics of the vehicle 102 or decreases the clearance of the vehicle 102. FIG. 3C shows the second orientation of bike 116. In this example, vehicle processing unit 104 determined the most optimal position of bike 116 is lying flat on the roof of vehicle 102. Further, the second orientation reduces the clearance of vehicle 102.

Furthermore, the illustrative methodologies described herein may be implemented by a system comprising processing circuitry or a non-transitory computer program product comprising instructions which, when executed by at least one processor, causes the processor to perform any of the methodology described herein.

In several example embodiments, the elements and teachings of the various illustrative example embodiments may be combined in whole or in part in some or all of the illustrative example embodiments. In addition, one or more of the elements and teachings of the various illustrative example embodiments may be omitted, at least in part, and/or combined, at least in part, with one or more of the other elements and teachings of the various illustrative embodiments.

Any spatial references such as, for example, "upper," "lower," "above," "below," "between," "bottom," "vertical," "horizontal," "angular," "upwards," "downwards," "side-to-side," "left-to-right," "right-to-left," "top-to-bottom," "bottom-to-top," "top," "bottom," "bottom-up," "top-down," etc., are for the purpose of illustration only and do not limit the specific orientation or location of the structure described above.

In several example embodiments, while different steps, processes, and procedures are described as appearing as distinct acts, one or more of the steps, one or more of the processes, and/or one or more of the procedures may also be performed in different orders, simultaneously, and/or sequentially. In several example embodiments, the steps, processes and/or procedures may be merged into one or more steps, processes, and/or procedures.

In several example embodiments, one or more of the operational steps in each embodiment may be omitted. Moreover, in some instances, some features of the present disclosure may be employed without a corresponding use of the other features. Moreover, one or more of the above-described embodiments and/or variations may be combined in whole or in part with any one or more of the other above-described embodiments and/or variations. The phrase "at least one of A and B" should be understood to mean "A; B; or both A and B." The phrase "one or more of the following: A, B, and C" should be understood to mean "A; B; C; A and B; B and C; A and C; or all three of A, B, and C." The phrase "one or more of A, B, and C" should be understood to mean "A; B; C; A and B; B and C; A and C; or all three of A, B, and C."

Although various embodiments and methods have been shown and described, the disclosure is not limited to such embodiments and methods and will be understood to include all modifications and variations as would be apparent to one skilled in the art. Therefore, it should be understood that embodiments of the disclosure are not intended to be limited to the particular forms disclosed. Rather, the intention is to cover all modifications, equivalents and alternatives falling within the spirit and scope of the disclosure as defined by the appended claims.

What is claimed is:

1. A method comprising:
obtaining, using a sensor communicably coupled to a vehicle processing unit, dimensional data of an object on a roof of a vehicle;
determining, using the dimensional data, a first orientation of the object on the roof; and
determining, using the first orientation of the object, a second orientation for the object which optimizes aerodynamics of the vehicle or reduces clearance of the vehicle,
wherein:
a plurality of sensors are placed on moveable components of the object; and
the dimensional data corresponds to movements of the components.

2. The method of claim 1, wherein:
a plurality of objects are on the roof of the vehicle; and
the second orientation corresponds to an orientation of the plurality of objects that optimizes aerodynamics of the vehicle or reduces clearance of the vehicle.

3. The method of claim 1, wherein the second orientation is an orientation which takes into account aerodynamics of the vehicle and clearance of the vehicle.

4. The method of claim 1, wherein route data of the vehicle is used to determine the second orientation.

5. The method of claim 1, wherein at least one of the sensors are removably coupled to the object on the roof of the vehicle.

6. A vehicle system, comprising:
a vehicle processing unit; and
a sensor communicably coupled to the vehicle processing unit,
wherein the vehicle processing unit is configured to:
obtain, using the sensor, dimensional data of an object on a roof of a vehicle;
determine, using the dimensional data, a first orientation of the object on the roof; and
determine, using the first orientation of the object, a second orientation for the object that optimizes aerodynamics of the vehicle or reduces clearance of the vehicle,
wherein:
a plurality of sensors are placed on moveable components of the object; and
the dimensional data corresponds to movements of the components.

7. The system of claim 6, wherein:
a plurality of objects are on the roof of the vehicle; and
the second orientation corresponds to an orientation of the plurality of objects that optimizes aerodynamics of the vehicle or reduces clearance of the vehicle.

8. The system of claim 6, wherein the second orientation is an orientation which takes into account aerodynamics of the vehicle and clearance of the vehicle.

9. The system of claim 6, wherein route data of the vehicle is used to determine the second orientation.

10. The system of claim 6, wherein at least one of the sensors are removably coupled to the object on the roof of the vehicle.

11. A method comprising:
obtaining, using a sensor communicably coupled to a vehicle processing unit, dimensional data of an object on a roof of a vehicle; and
determining, using the dimensional data, an orientation for the object on the roof that optimizes aerodynamics of the vehicle and reduces clearance of the vehicle,
wherein:
a plurality of sensors are placed on moveable components of the object; and
the dimensional data corresponds to movements of the components.

12. The method of claim 11, wherein the orientation is output as a recommendation.

13. The method of claim 11, wherein:
a plurality of objects are on the roof of the vehicle; and
the orientation corresponds to an orientation of the plurality of objects with respect to one another on the roof of the vehicle.

14. The method of claim 11, wherein a route of the vehicle is used to determine the orientation.

15. The method of claim 11, wherein at least one of the sensors are removably coupled to the object on the roof of the vehicle.

* * * * *